US009471640B2

(12) United States Patent
Wolf et al.

(10) Patent No.: US 9,471,640 B2
(45) Date of Patent: Oct. 18, 2016

(54) AUTOMATIC CONVERSION OF UNITS OF MEASURE DURING DATA STREAM PROCESSING

(71) Applicants: Bernhard Wolf, Dresden (DE); Andre Preussner, Dresden (DE); Raik Hartung, Dresden (DE); Arne Schramm, Dresden (DE); Johannes Hoenger, Dresden (DE)

(72) Inventors: Bernhard Wolf, Dresden (DE); Andre Preussner, Dresden (DE); Raik Hartung, Dresden (DE); Arne Schramm, Dresden (DE); Johannes Hoenger, Dresden (DE)

(73) Assignee: SAP SE, Walldorf (DE)

( * ) Notice: Subject to any disclaimer, the term of this patent is extended or adjusted under 35 U.S.C. 154(b) by 254 days.

(21) Appl. No.: 14/031,750

(22) Filed: Sep. 19, 2013

(65) Prior Publication Data
US 2015/0081672 A1 Mar. 19, 2015

(51) Int. Cl.
G06F 17/30 (2006.01)

(52) U.S. Cl.
CPC .............................. *G06F 17/30516* (2013.01)

(58) Field of Classification Search
None
See application file for complete search history.

(56) References Cited

U.S. PATENT DOCUMENTS

| | | | |
|---|---|---|---|
| 4,228,516 A | 10/1980 | Johnston | |
| 6,636,880 B1 | 10/2003 | Bera | |
| 7,190,728 B2 * | 3/2007 | Kawada et al. | 375/259 |
| 7,325,194 B2 | 1/2008 | Moore et al. | |
| 7,457,837 B2 | 11/2008 | Baumann | |
| 8,316,012 B2 | 11/2012 | Abouzeid et al. | |
| 8,396,886 B1 | 3/2013 | Tsimelzon et al. | |
| 8,423,576 B2 | 4/2013 | Drissi et al. | |
| 8,504,582 B2 | 8/2013 | Soetarman | |
| 8,595,452 B1 | 11/2013 | Katzer et al. | |
| 8,635,208 B2 | 1/2014 | Wolf | |
| 2003/0101204 A1 | 5/2003 | Watson | |
| 2004/0068529 A1 | 4/2004 | Pai | |
| 2010/0022265 A1 * | 1/2010 | Dei | H04L 65/4061 455/518 |
| 2011/0016160 A1 * | 1/2011 | Zhang et al. | 707/805 |
| 2011/0029546 A1 * | 2/2011 | Mineno et al. | 707/756 |
| 2011/0107327 A1 * | 5/2011 | Barkie et al. | 717/176 |
| 2011/0137859 A1 * | 6/2011 | Dickman | 707/610 |
| 2012/0143831 A1 | 6/2012 | Amulu et al. | |
| 2012/0323941 A1 * | 12/2012 | Chkodrov | G06F 17/30516 707/756 |
| 2013/0226953 A1 | 8/2013 | Markovich et al. | |
| 2013/0254238 A1 * | 9/2013 | Yan et al. | 707/793 |
| 2013/0331961 A1 * | 12/2013 | Mosley | 700/73 |
| 2014/0082013 A1 | 3/2014 | Wolf et al. | |

FOREIGN PATENT DOCUMENTS

WO  WO 2014000771 A1 *  1/2014  ............. G06F 17/30

OTHER PUBLICATIONS

Anonymous; Sensor Event Service—SES—Web-based Complex Event Processing, retrieved online on Sep. 18, 2013; 5 pages; (http://52north.org/communities/sensorweb/ses/0.0.1/).

Bernhard Wolf et al.; U.S. Appl. No. 13/623,682, filed Sep. 20, 2012; Query Templates for Queries in Data Stream Management Systems; 33 pages.

R. A. Peppler et al., Mar. 2008, DOE/SC-ARM/TR-082 p. 5; Quality Assurance of ARM Program Climate Research Facility Data; total number of pp. 71 (http://www.arm.gov/publications/tech_reports/doe-sc-arm-tr-082.pdf).

* cited by examiner

*Primary Examiner* — James Trujillo
*Assistant Examiner* — Aida Tessema

(57) ABSTRACT

Data streams are received for processing by a query. The query is associated with expected input data stream types and expected output data stream types. The received data streams are evaluated to determine if they correspond to the expected data stream types. If the received data stream types define data for a physical quantity that is defined in a unit of measure that is not the expected unit of measure, then unit conversion is required. Predefined mappings are utilized for performing required unit conversions and an optimal solution for conversion is determined. The unit conversions are performed automatically by unit conversion operators that are integrated within the process of generating of a runnable query. The runnable query is deployed and executed to generate result output streams that match the expected output stream type.

19 Claims, 16 Drawing Sheets

AUTOMATIC CONVERSION OF UNITS OF MEASURE DURING DATA STREAM PROCESSING

BACKGROUND

The definition and practical use of units of measure play a significant role in human business and commercial activities. Units of measure define magnitude of physical quantities. They are adopted by different conventions as a standard form for measurement of the same physical quantity. There are different systems that provide their own definitions for units of measure, for example, the Imperial System of Units, the Metric System, or the International System of Units (SI). The Unified Code for Units of Measure (UCUM) is a system of codes for unambiguous presentation of units of measure, which may be used by humans and machines. The UCUM includes all units of measures that are used in international science, engineering, and business. The usage of such systems may facilitate the unambiguous communication of quantities together with their units. Most importantly, this communication may be an electronic communication between machines (computers). Units of measure may be used when defining length, temperature, energy, time, pressure, currencies, etc. The variety of units is a challenge for both systems that process data containing units and users of such systems, since the wrong usage of data (e.g., mixing metric and imperial units for calculation) can lead to wrong results and critical errors.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

DETAILED DESCRIPTION

Embodiments of techniques for conversion of units of measure during data stream processing are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Data stream processing is a paradigm where data streams are processed by utilizing data stream operators. An orchestration of streams and operators is called a data stream query. If streams, which are processed by one query, represent different units of measure, a conversion of the stream values may be required before or during the data stream processing. For example, when comparing two temperature signals, where one signal is provided in ° C., while the second one is ° F. For a proper comparison, at least one of the two signals needs to be converted. Another example is when one calculates an average temperature for a given region and the information regarding the temperature is not provided in a common unit of measurement for all of the regions. Then, a conversion is required to calculate the average temperature. In one embodiment, the result average temperature may be requested to be defined in ° F.

Figure 1:
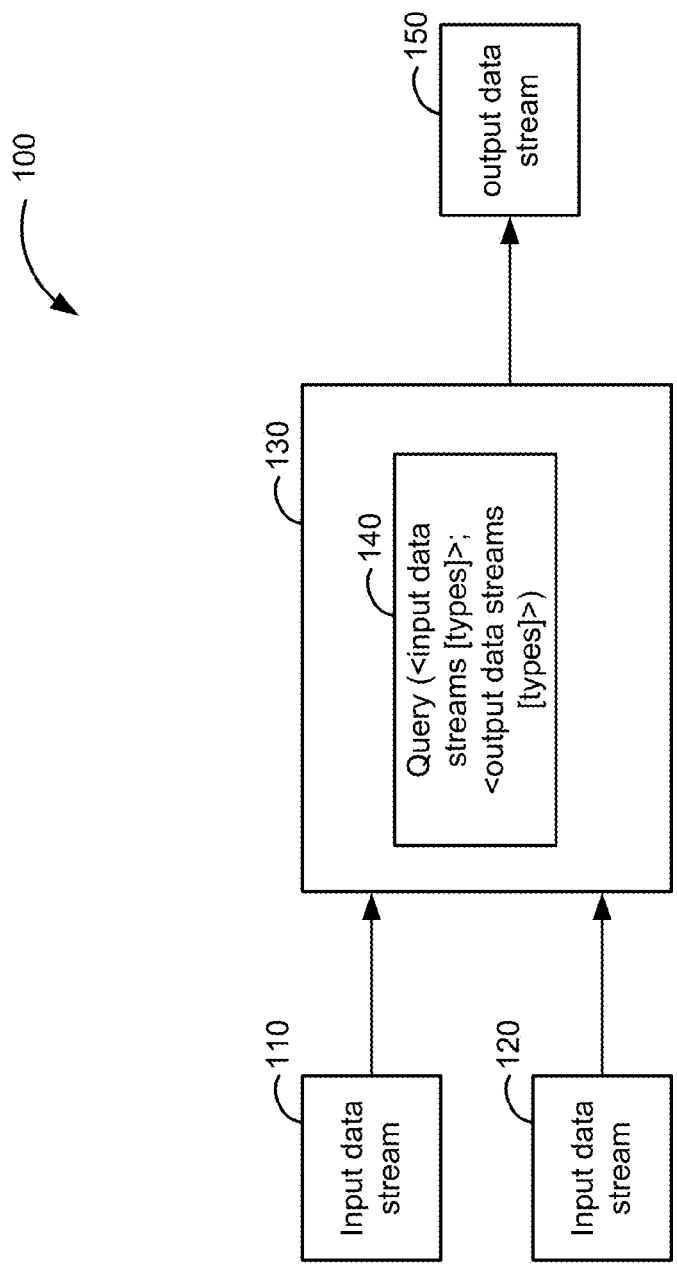
FIG. 1 is a block diagram illustrating an embodiment of a method for processing data streams by a query.

FIG. 1 is a block diagram illustrating an embodiment of a method 100 for processing data streams by a query. An input data stream 110 and an input data stream 120 are processed by a query 140. The input data stream 110 and the input data stream 120 may have a data stream type. The information about the stream type may be stored in a stream metadata that describes characteristics of each data stream. In one embodiment, the characteristics described in the stream metadata may be such as the physical quantity defined by the data stream and the units of measure used for the physical quantity. In one embodiment, the query 140 may expect a set of input data streams and produce a set of output data streams. In one embodiment, an input stream for a query may be an output stream produced by another query. There may be defined an expected input data stream type and an expected output data stream type for each input data stream from the set of input data streams and for each output data stream from the set of output data streams, respectively. In one embodiment, the query 140 may include one or more operators for processing input data streams. An operator may expect some input streams with a given set of input types and may provide an output stream of a different type. In one embodiment, a user may specify via an interface, such as a graphical user interface (GUI), an expected output type for an operator or for a query. In one embodiment, the expected input stream types by the query 140 may differ from type of the received input data stream 110 and 120. Then, the input streams 110 and 120 may be converted according to the expected input stream types. The query 140 may generate an output data stream 150 with the expected output stream type. The expected output stream types may differ from the produced output data stream types, which mean that conversion may be required. The query 140 may take the converted input data streams, process them according to the logic of the query, and determine one or more result data streams. If the result data stream types do not correspond to the expected output types, the result data streams may be converted to correspond to the expected types. If the query 140 includes more than one operator, then the processing of the input data streams 110 and 120 may be defined in a series of steps according to the defined operators and operator's requirements.

Figure 2:
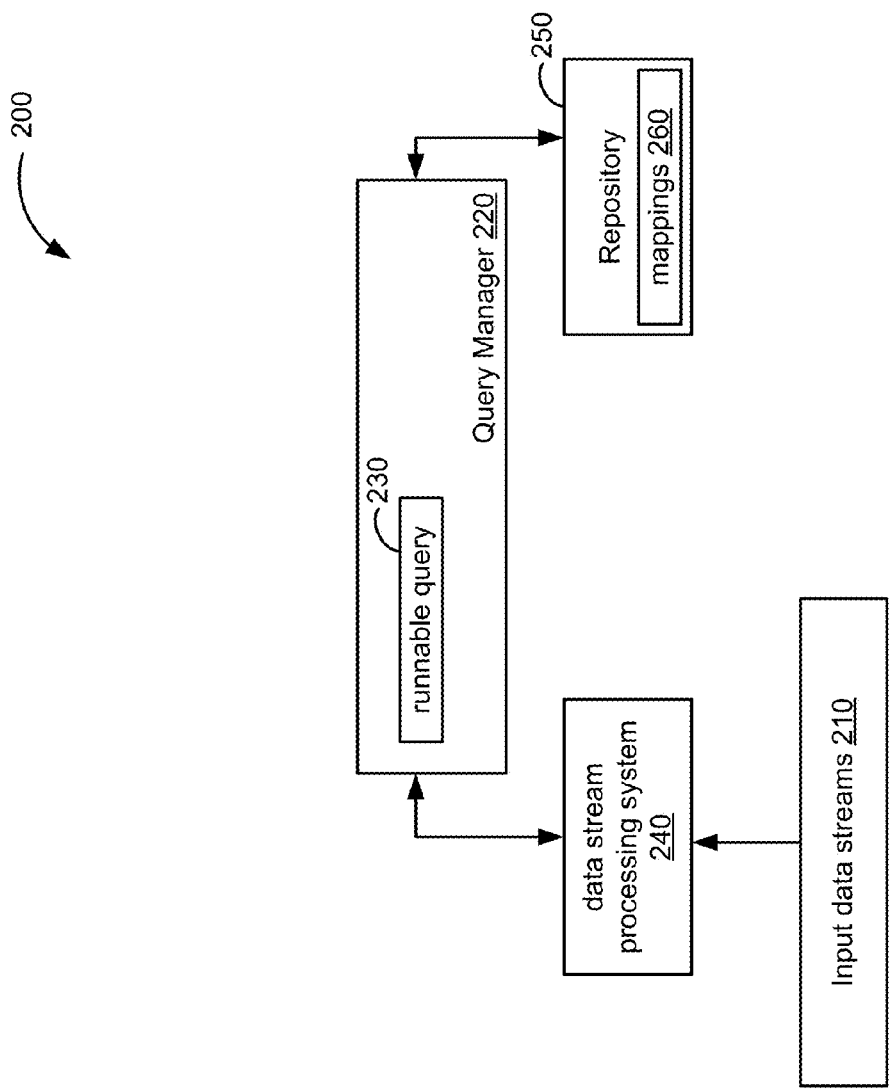
FIG. 2 is a block diagram illustrating an embodiment of a system for processing data streams.

FIG. 2 is a block diagram illustrating an embodiment of a system 200 for processing data streams. A data stream processing system 240 may process data streams by queries, which include input data streams 210. The input data streams 210 are streamed through a data stream processing system 240. The Query Manager 220 creates a runnable query 220 to be deployed on the data stream processing system 240 for processing the input data stream 210 according to a given query. The Query Manager 220 may have access to metadata of the input data streams 210. The query may be such as the query 140, FIG. 1. In one embodiment, the Query Manager 220 automatically inserts additional operators for required conversion during the processing of the input data streams 210. In one embodiment, required conversion may include conversion of units of measurement of values that are transported with the input data streams 210, according to the input requirements of the query. The produced output streams may further required conversion according to the expected output stream types for the produced output streams. For example, the expected output stream types may be defined by a user through a GUI. Another example is that the expected output stream types may be defined in additional query-independent metadata stored in a repository. The conversion of the values may be accomplished during runtime of the query in the data stream processing system 240. The Query Manager 220 may perform additional conversion of the result output stream to match output requirements for the query. The Query Manager 220 communicates with a repository 250 that stores mappings 260, such as unit mappings for conversion of units of measure for different physical quantities. Unit mappings represent relations between units and each physical quantity may have its own mapping. A mapping is a formula for conversion from one unit of measure to another. A mapping may be defined in different mapping formats. In some embodiments, bi-directional mappings may be used. Bi-directional mappings define a formula for each direction of conversion between each two units of measure within the mapping. For instance, a mapping between units U1 and U2 may contain a formula for converting from U1 to U2 and from U2 to U1. The Query Manager 220 takes the received input data streams 210 and creates the runnable query 230. In one embodiment, the runnable query 230 is a query that is extended with required input conversion operators for converting the input data streams 210 to match the expected input data stream types and output conversion operators associated with the expected output data stream types. The Query Manager 220 is in communication with the Data Stream processing system 240 that is an executing system to execute the runnable query 230 that consumes the input data streams 210 and produces data streams according to the operations and logic implemented into the runnable query 220.

Figure 3:
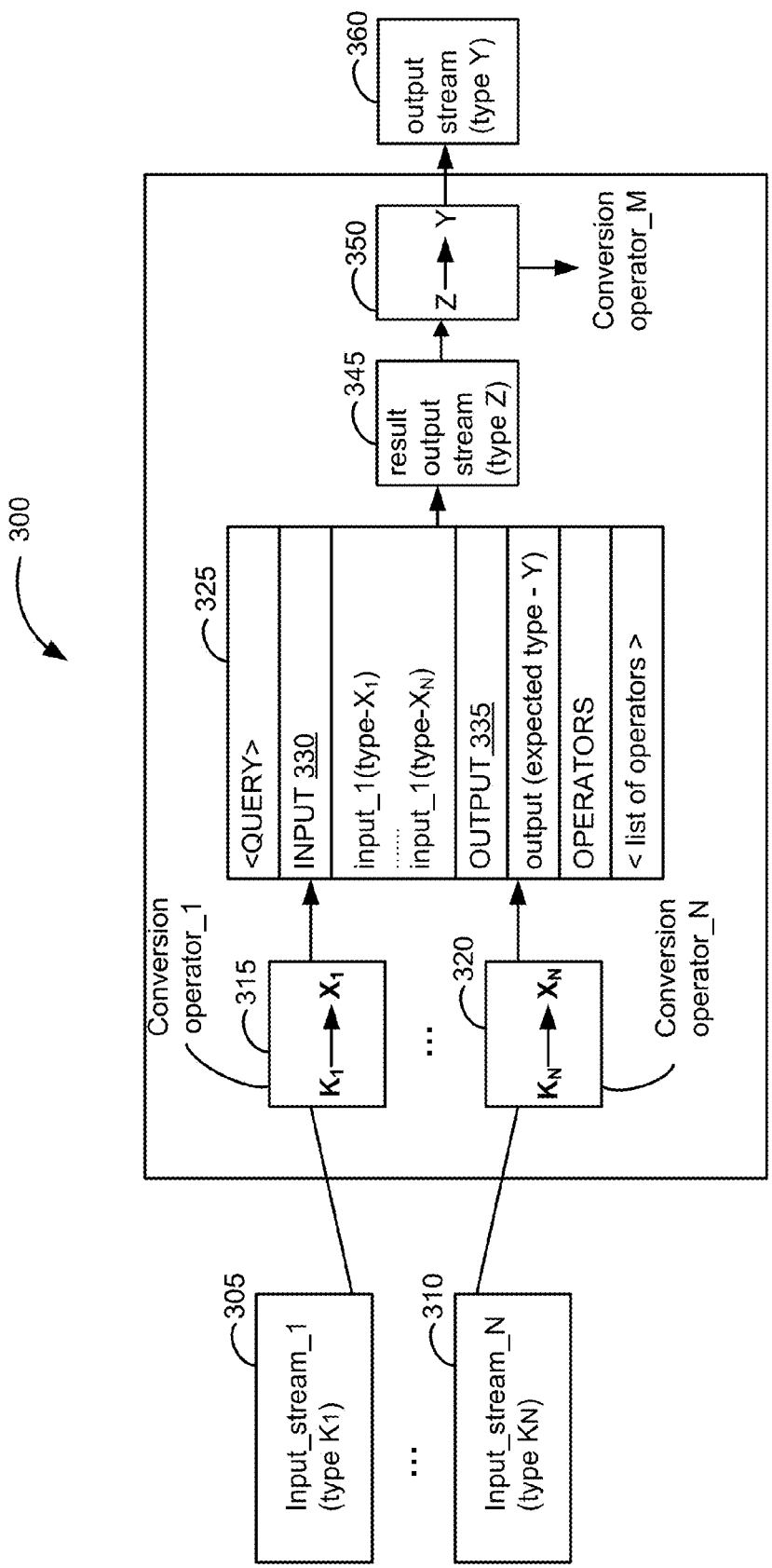
FIG. 3 is a block diagram illustrating an embodiment of a method for processing data streams that includes conversion of units of measure.

FIG. 3 is a block diagram illustrating an embodiment of a method 300 for processing data streams that includes conversion of units of measure. Input streams, starting from an input_stream_1 305 through an input_stream_N 310, are processed by a query 325. A query 325 may include only one operator, or a combination of operators. In one embodiment, the query 325 may be such as the query 140, FIG. 1. In one embodiment, the query 325 may have metadata that describes the properties of the included operators, such as the expected inputs. This means that the metadata may describe which are the physical quantities and expected units of measure of the expected inputs. Such metadata may be stored inside of the query 325 or separately, for example, in a repository. Query metadata, including operator metadata may be retrieved from the query and used during the data processed of input streams by the query 325.

The query 325 may be associated with expected input 330 stream types and expected output 335 stream types. In one embodiment, the type of the expected output stream types may be defined according to user preferences with respect to a specific use case and may be defined by the user through a graphical user interface (GUI). The input stream input_stream_1 305 to input_stream_N 310 may be converted to match the expected input 330 by conversion operators, such as conversion operator_1 315 till conversion operator_N 320. The conversion operators 315 and 320 may transform the units of measure of the input streams so that the input streams may be processed by the query 325. The conversion operators 315 and 320 may be integrated during the process of generating the query 325. When the query 325 is generated in a runnable form, it may be executed to consume the defined input streams and to generate a result stream. The conversion operators may be automatically inserted to provide the input streams in a desired stream type to the query 325, so that the execution of the query 325 is performed correctly.

The input_stream_1 305 may have a stream type K1, and, for example, input_1 from the input 330 may expect a stream type X1. If the input streams provide information for the same physical quantity as the expected from the query 325, then a conversion may be required. For example, the type K1 may be converted to type X1 by the conversion operator_1 315. The query 325 processes the converted input streams in the expected stream types according to operators 330. A result output stream 345 may be generated based on the executed query 325. The result output stream 345 may be in type Z, which is based on the expected stream types by the query 325—type X1 to XN. In one embodiment, a user may have further defined that the expected type of the output stream is type Y. The definition of the expected output streams by the query 325 may be defined in section output 335. The result output stream 345 may have a different stream type than the expected stream type for the result output stream 345 by the query 325. A conversion from type Z to type Y may be possible and accomplished through conversion operator_M 350. After the conversion, the result output stream 345 is transformed to an output stream 360, which is of type Y.

In one embodiment, for performing conversion operations, such as the operations defined in the conversion operator_1, conversion operator_N 320, conversion operator_M 350, etc., predefined unit mappings may be used. The conversion operations aim to transform physical quantity values defined in a certain unit of measure into another unit of measure. For example, such operations may transform length defined in meters into length defined in kilometers, or vice versa. Unit mappings are mappings that present relations between units. Each physical quantity may have its own mapping. For a given physical quantity a number of different representations (mapping formats) of such mappings may be defined including a list of units of measure. A mapping is a formula for conversion of one unit of measure to another. For example, a mapping may depict only 3 units of measure for a given physical quantity. Another mapping defined for the same physical quantity may define formulas for conversion between different numbers of units of measure, e.g. 5 units. The other mapping may not contradict to the formulas defined for conversion in the first mapping, but may extend the defined formulas by incorporating additional units of measure and formulas for conversion between them and the already present units. In one embodiment, there are different mapping formats to present a mapping for a physical quantity—e.g., base unit mapping, full mapping, partial mapping, ring mapping, and chain mapping, etc. The number of such mapping formats is not limited to the listed examples.

Figure 4A:
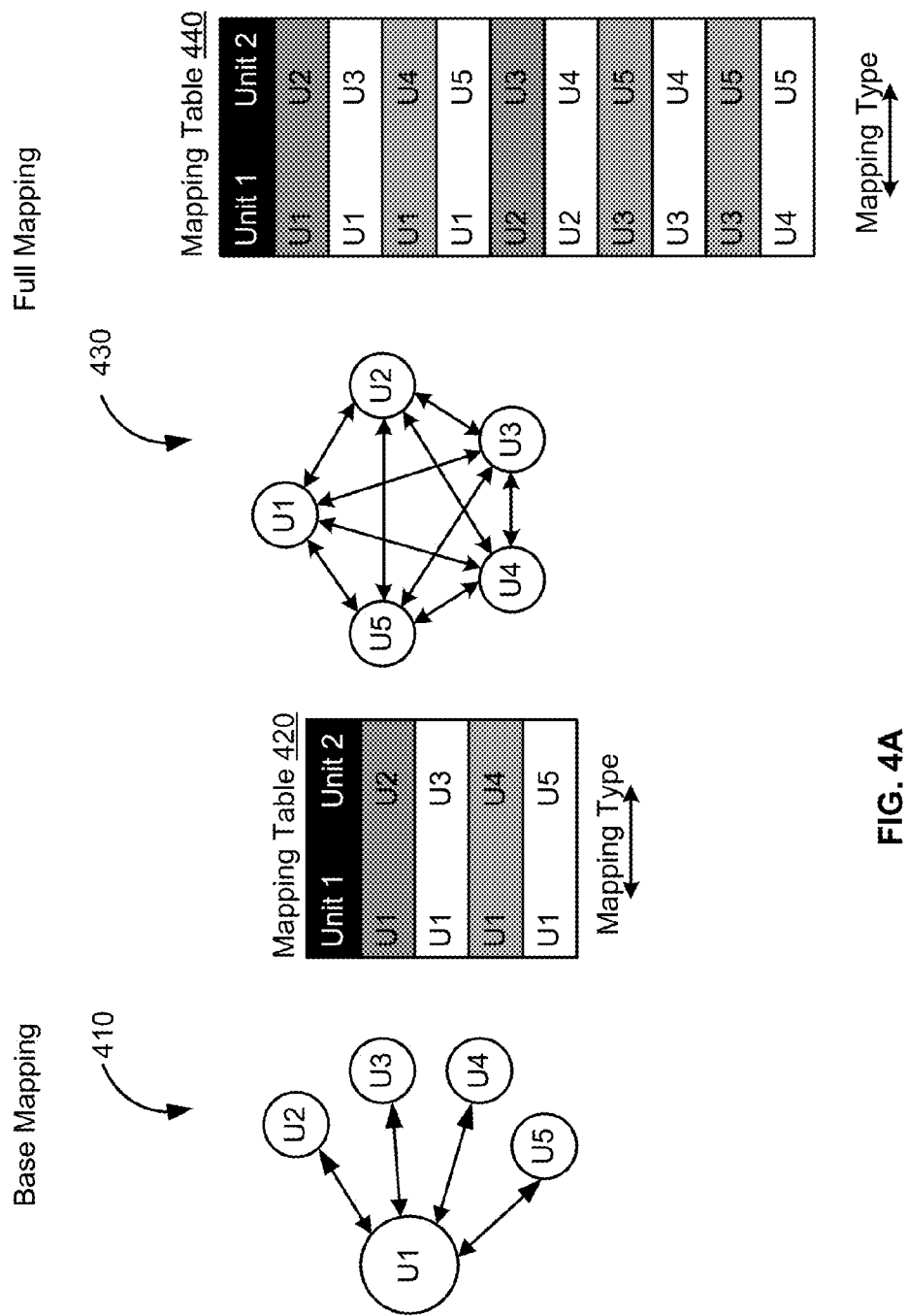
FIG. 4A is a block diagram illustrating embodiments of mappings defined for conversion of units of measure.

FIG. 4A is a block diagram illustrating embodiments of mappings defined for conversion of units of measure. Mappings may be defined in different formats that include different logic for mapping of units of measure, listed for a certain physical quantity. Base mapping may be presented in a graph 410 and defines a mapping between a number of units of measure and a base unit, where each of the units of measure is mapped bi-directionally to the base unit. In one embodiment, within the graph 410, U1 is a base unit that is mapped to units U2, U3, U4, and U5. U1, U2, U3, U4 and U5 may be any kind of units of measure. For example, for time quantities, these units may be seconds, minutes, hours, days, and months. The mapping may be presented in form of a graph or in a table, such as mapping table 420. Using the base mapping, values defined in units U3 may be converted to values in U2. The conversion may be accomplished by going between nodes from the graph 410. Firstly, converting from U3 to U1, and then from U1 to U2. A mapping between two units of measure in a graph is presented with an edge, and a mapping defines how one unit in a first unit of measure may be converted to another unit in a second unit of measure.

In one embodiment, if an input stream is defined using a unit of measure "mile" and if we have the base mapping for the physical quality length, we may convert miles to inches. The mapping helps when converting a value in miles into a value in other unit of measure by defined formulas for conversion. The base mapping may be defined such that the base unit is "meter" and the base mapping for length may allow converting from miles to meter, and then from miles to inches. In another embodiment, the base unit of the base mapping may be different than "meter", which means that miles may be converted to the other base unit and then from that base unit to the required unit—inches.

In one embodiment, full mappings define a different schema for conversion between units. The full mapping defines a graph 430 that determines relations between units U1, U2, U3, U4, and U5. Mapping table 440 presents the relationships between the units that exist in the graph 430. For example, unit U1 may be converted to unit U5 directly. Also, unit U1 may be converted to unit U2. In another example, unit U1 may be converted to unit U2, by firstly converting the unit U1 to unit U5, and then converting unit U5 to unit U2. Other alternative combinations between the units are possible as defined with the edges of the graph 430. Full mappings allow direct conversion of each of the units from a given set of units of measure to any of the rest of the units from the set.

Figure 4B:
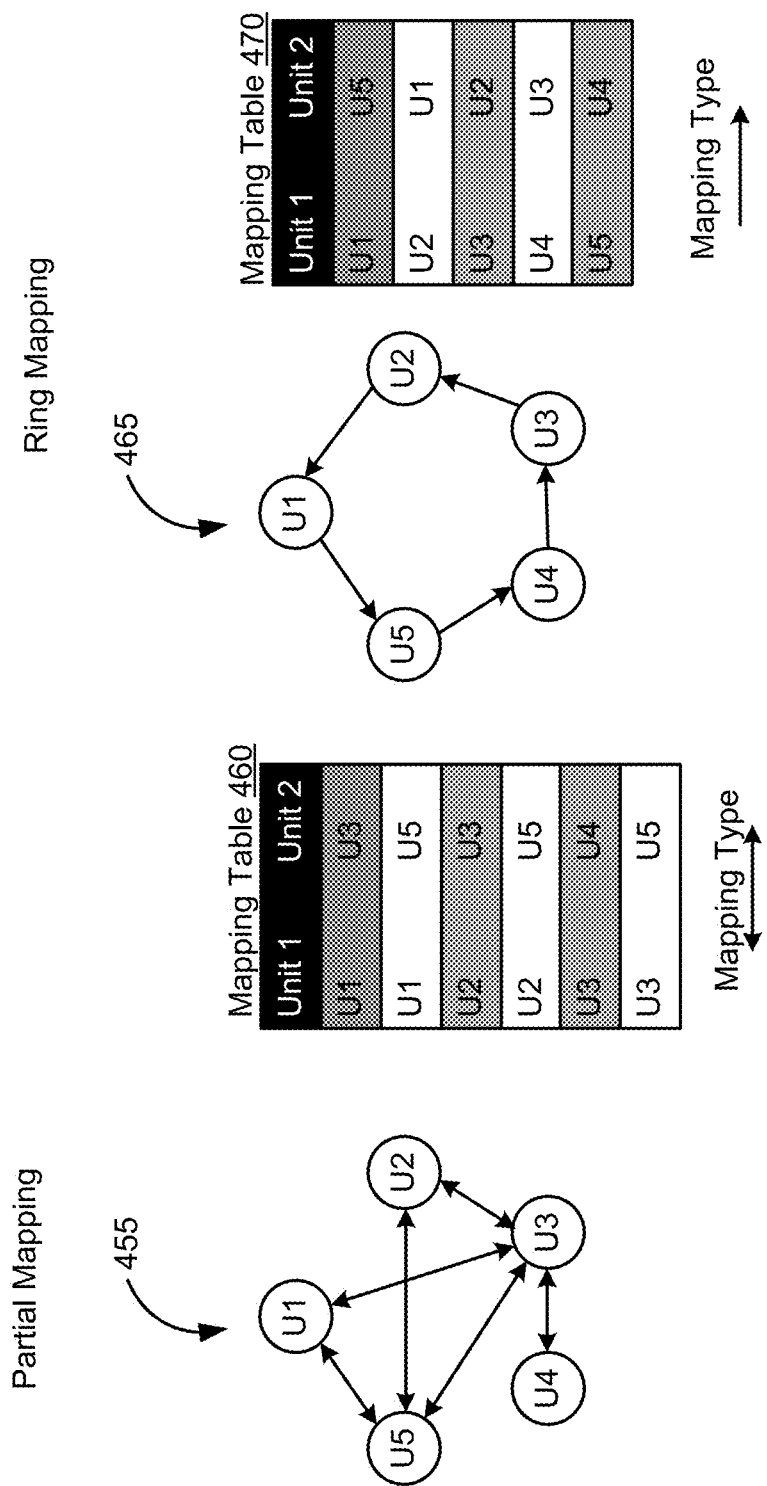
FIG. 4B is a block diagram illustrating embodiments of mappings defined for conversion of units of measure.

FIG. 4B is a block diagram illustrating embodiments of mappings defined for conversion of units of measure. Partial mapping and ring mapping are mappings in different formats that may be used when converting values defined in different units of measure. When applying a partial mapping, each unit of measure, which is defined within the mapping, is connected to at least one other unit of measure. In one embodiment, partial mapping may be presented in a graph 455 having five nodes that represent different units of measure—U1, U2, U3, U4, and U5. These units of measure may be defined for a physical quantity and depict the most important and frequently used units of measure for that physical quantity. In addition, there may be other units of measure for that physical quantity that are not depicted in the graph 455, but may extend the graph 455 in another graph that incorporates the logic from the graph 455. The graph 455 includes edges between the nodes that present relations for transformation between units of measure. For example, the edge between U1 and U5 is a bi-directional link that maps how a value defined in a unit of measure U1 can be converted to a value defined in the unit of measure U5, and vice versa. The partial mapping, as shown in the exemplary graph 455, contains mappings in form of edges that cover at least one mapping between a unit of measure and another unit from the rest of the units of measure. In such manner, all of the units are connected and there is an existing path between each one of the units of measure. For instance, between U4 and U5, there is no direct mapping. However, to convert a first value defined in the unit of measure U4 to a second value in a unit of measure U5, one may convert the first value to an intermediate value defined with the unit of measure U3, as there is an edge between U4 and U3, and then to convert from the intermediate value to the second value (there is an edge between U3 and U5). Other different options for such conversions are also possible. A mapping table 460 depicts the nodes and edges defined in the graph 455. The connections between the units in the mapping table 460 are bi-directional.

In one embodiment, ring mapping is a mapping where each unit of measure may be converted to one other unit in a ring topology. A graph 465 presents an embodiment of the ring mapping that includes five units of measure. U1, U2, U3, U4, and U5 are nodes from the graph 465 that are positioned in such manner that form a cycle, which means that there is a sequence of nodes that starts and ends at the same node, and each two consecutive nodes in the sequence are connected to each other in the graph 465. The graph 465 has five nodes and five edges that connect each two consecutive nodes in a uni-directional form. In graph 465, units U1 and U5, U5 and U4, U4 and U3, U3 and U2, U2 and U1 are connected. Mapping table 470 presents the mappings defined with the edges from the graph 465. In another embodiment, the ring mapping may be defined in a bi-directional form. If the ring mapping is defined in a bi-directional form, then for example U1 may be converted to U5, and vice versa, U5 may be converted to U1. Therefore, the mapping table 470 may be extended with five more rows to present all the possibilities for conversion between the five nodes in the ring mapping. In another embodiment, the presentation of all of the conversions may be accomplished through marking that the mapping type is bi-directional, as defined for other mappings, e.g. the partial mapping.

Figure 4C:
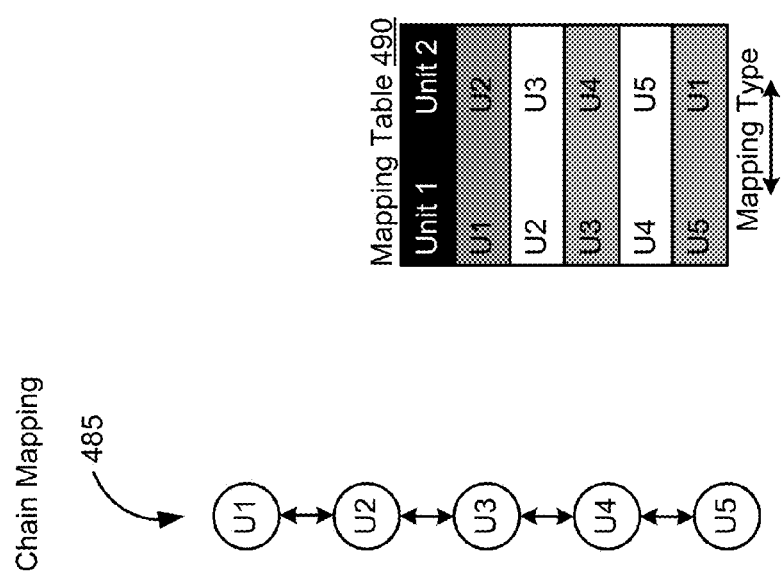
FIG. 4C is a block diagram illustrating an embodiment of a mapping defined for conversion of units of measure.

FIG. 4C is a block diagram illustrating an embodiment of a mapping defined for conversion of units of measure. Graph 485 presents an embodiment of a chain mapping for five units of measure. The chain mapping is a mapping between units of measure, where units are connected bi-directionally and sequentially. Graph 485 has five nodes and four edges between the nodes, which all form a chain. Mapping table 490 depicts the mapping defined in the graph 485.

Figure 5A:
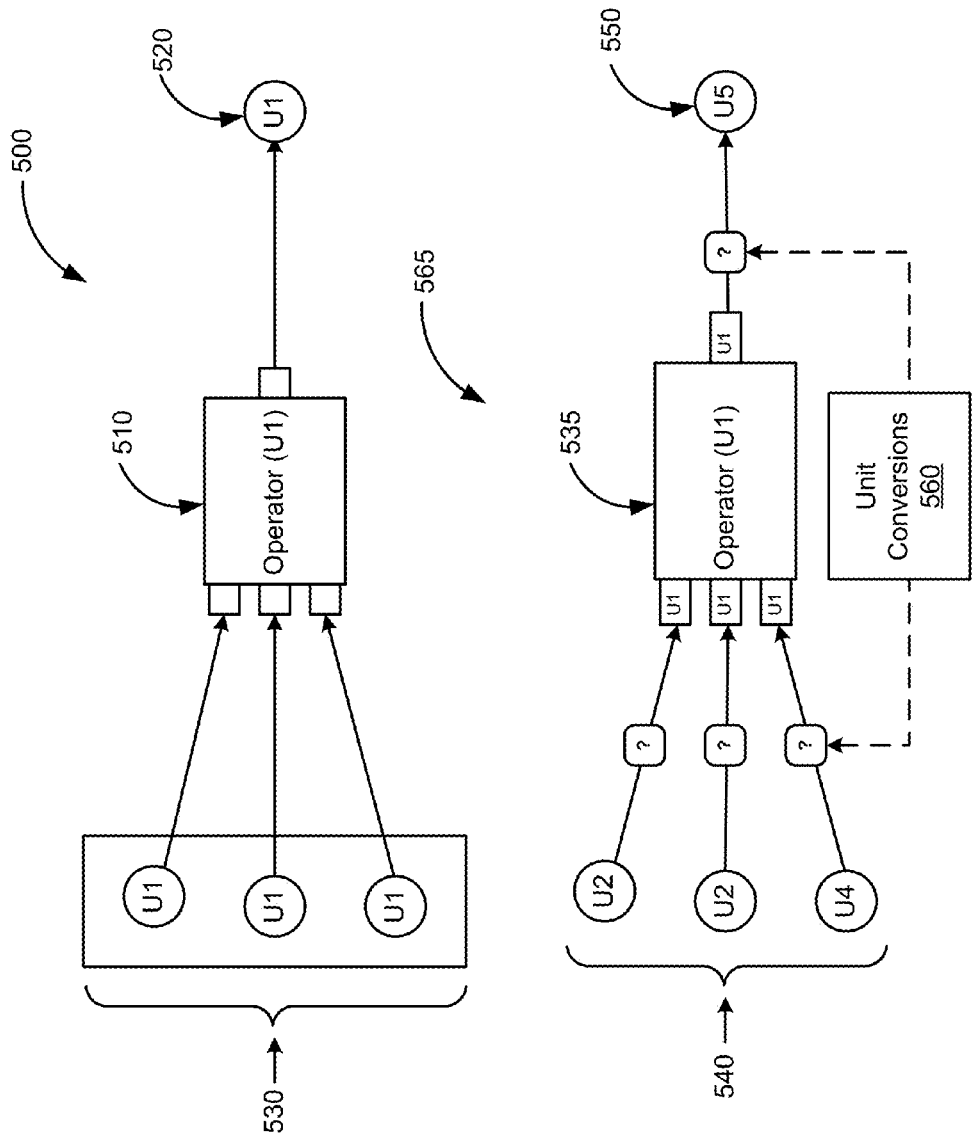
FIG. 5A is a block diagram illustrating an embodiment of operators for processing data streams.

FIG. 5A is a block diagram illustrating an embodiment of operators for processing data streams. In an embodiment 500, data streams may represent different or equal units of measure. Three data streams 530 present data quantities in one unit of measure—U1, and are processed by an operator 510. The three data streams 530 may convey data for example for the physical quantity length. The U1 unit of measure may be kilometers, and the three data streams 530 may define different quantities, for example 5 km, 3 km, and 2 km. The operator 510 may have an expected type of the data streams that the operator 510 may process. For example, the expected type may define that the quantity is length in units of measure—U1. If the expected type is equal to the type of the three data streams 530, then the data streams may be processed without intermediate conversion of the units of measure. Based on the logic of the operator 510, a result output stream 520 may be generated. The operator 510 does not define an expected output stream type for the result output stream 520. The result output stream 520 is defined in unit of measure—U1.

In another embodiment 565, three data streams 540 that are processed by an operator 535 may not match the expected stream types by the operator 535. For example, the three data streams 540 may be defined in different units of measure than the expected units of measure by the operator 535. For example, the three data streams 540 may be defined in units of measure U2, U2, and U4, and the expected input stream types by the operator 535 may be U1, U1, and U1. Therefore, conversion of the data stream defined in unit of measure U2 to generate a value that is in unit of measure U1 is required. Also, conversion for the third data stream is also required. The conversion of the data stream 535 is required according to the expected units of measure. The operator 535 may further define an expected unit of measure for the output data stream, such as U5. The operator 535 may generate an output stream defined in unit of measure U1. Therefore, a conversion of the generated result output stream based on the operations on the three data streams 540 is required to generate an expected output stream 550 having a unit of measure U5. The conversions of the three data streams 540 to match the expected unit of measure and of the result output stream to match the expected unit of measure for the output data stream may be accomplished through unit conversions 560. The unit conversions 560 may incorporate operations for converting data defined in a given unit of measure into a converted value in a different unit of measure.

The operations for conversion accomplished by the unit conversions 560 may implement the logic of mappings for conversion, such as the mappings described on FIGS. 4A, 4B, and 4C. The unit conversions 560 may be performed by automatically integrated unit conversion operators that are inserted during the process of generating an instance of operator 535 that is runnable and may be executed. In one embodiment, the operator 535 may be transformed into a runnable operator, such as the runnable query 230 by a query manager, such as the query manager 220. The operator 535 may be deployed on an execution system, such as the data stream processing system 240, FIG. 2. During the execution of the operator 535 the input data streams may be seamlessly converted to match the expected stream types defined by the operator 535 and a result output stream may be generated. The result output stream may also be automatically converted if needed to match the expected output stream type.

Figure 5B:
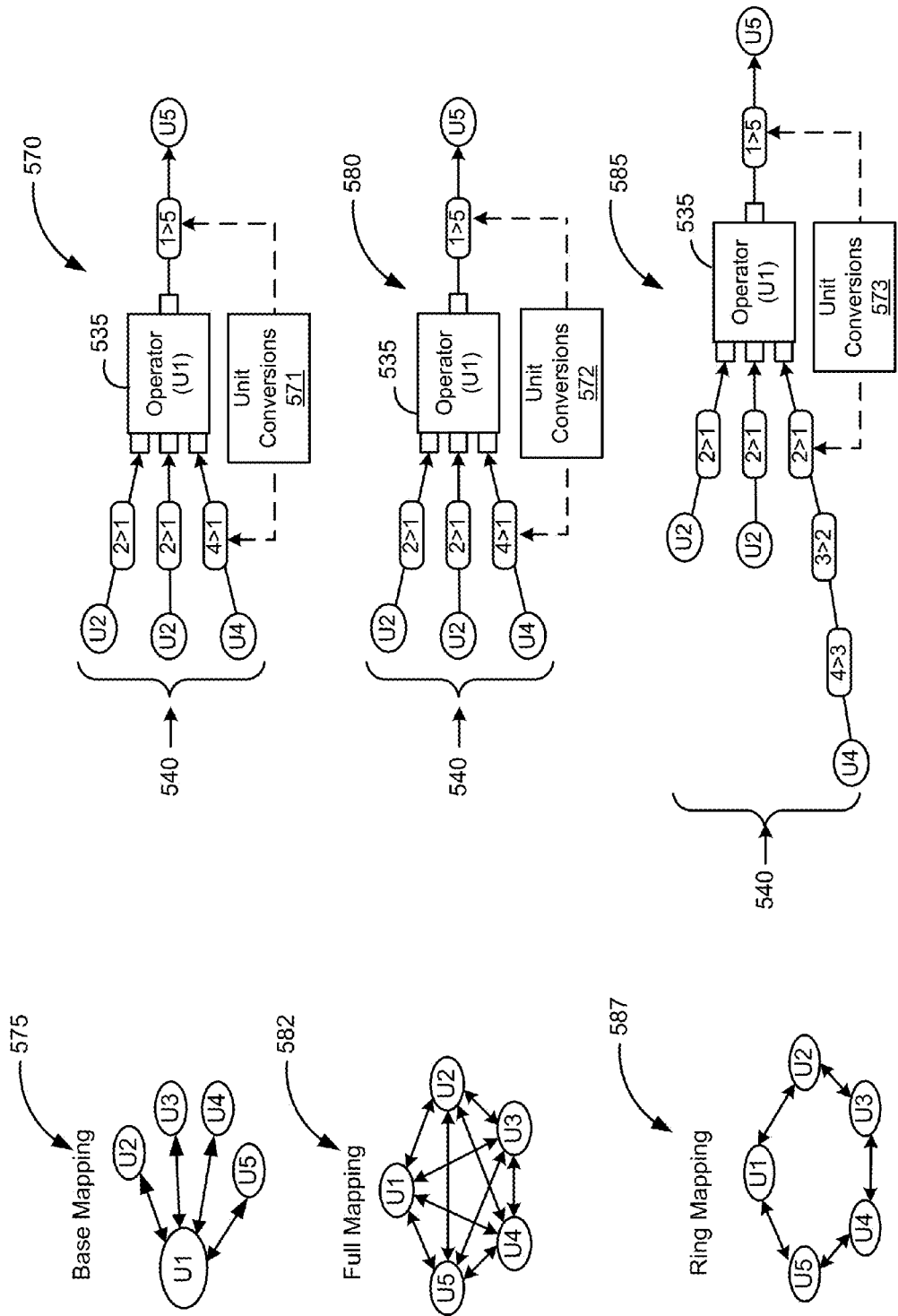
FIG. 5B is a block diagram illustrating embodiments of unit conversions according to different mapping formats, during processing of input data streams.

FIG. 5B is a block diagram illustrating embodiments of unit conversions according to different mapping formats, during processing of input data streams. Unit conversions are required when an operator, such as the operator 535 defines expected units of measure for the input and output data streams, and the provided input streams do not correspond to the expected unit of measure. Therefore, a conversion is accomplished before the operator takes the received input streams and after the operator generates an output stream, which is not defined in the produced unit of measure by the operator. In an embodiment, the conversion required in the case described in FIG. 5A with the operator 535 may be accomplished with the use of different mappings, such as base mapping, full mapping, and ring mapping.

The operator 535 defines input requirements for the received data streams, for example, the expected stream types by operator 535 define a physical quantity defined in unit of measure U1. For example, a base mapping 575, a full mapping 582, and a ring mapping 587 are pre-defined for that physical quantity, which is described by the three data streams 540. The logic of the base mapping 575, the full mapping 582, and the ring mapping 587 may be stored in a repository, and may be invoked when needed. In an embodiment 570, the base mapping 575 is used for accomplishing required conversions of the input and output streams. The base mapping 575 may be presented in form of a graph 575, having 5 nodes. A first data stream, from the three data stream 540 is defined in unit U2, and the expected unit is U1, therefore a conversion between U2 and U1 is required. For accomplishing the conversion, the logic of the base mapping may be used, and depicted from the graph 575. There is a direct conversion between U1 and U2 (presented with an edge), and thus one step conversion is enough to accomplish the required transformation before the data processing. Also, one step conversion is enough to accomplish the required post-conversion. The post-conversion is defined for the produced output stream to match the defined expected output stream type—U5. In one embodiment, a conversion operator used for the post-conversion may be used also for a conversion of the input data streams. Accordingly, unit conversions 571 are defined with the use of the base mapping. As a result, four unit conversions part of the unit conversions 560 are performed with the use of the preexisting base mapping.

In another embodiment 580, a full mapping definition for that physical quantity may also be defined and stored so that the logic of such unit mapping can be used for the unit conversions 560. The full mapping 582 and the defined logic within the full mapping may be used to accomplish conversions of the three data streams 540 to match the expected input stream types by operator 535 and to accomplish required conversion to generate a result output stream defined in the expected output stream type. Unit conversions 572 are defined with the use of the logic within the full mapping 582. From the graph representation of the full mapping 582, a path of sequential conversions may be found that accomplishes a conversion from U2 to U1, which may be applied for the pre-conversion operations. The pre-conversion operations are accomplished over received data streams that required conversion of the input data stream type to match the expected input stream type defined by the operator 535. Afterwards, for the post-conversion operations, a one-step conversion may be found within the graph that allows conversion from U1 to U5, as U5 is the expected unit of measure for the result output stream from the operator 535.

In yet another embodiment 585, the ring mapping 582 may be used for accomplishing required unit conversions for processing the three data streams 540 by the operator 535. Unit conversions 573 are defined with the use of the logic within the ring mapping 587 that is presented in a graph format. The ring mapping 587 is a bi-directional ring mapping. From the graph representation of the ring mapping 587, a path of sequential conversions may be found that accomplishes a conversion from U2 to U1. There is an edge in the graph between U2 and U1, so a one-step conversion can be performed for the transformation of the first two data streams which are defined in U2 unit of measure. For the third data stream, which is defined in U4 unit of measure, the following path within the graph for possible conversion may be determined. The node U4 is not directly connected to node U1, but node U4 is connected to U5 and U3. If we choose the path from U4 to U3, then we may choose the next node to be U2, and then U1. Therefore, there is a path from U4 to U1 which starts with U4, then U3, U2, and lastly, U1. This path may be used for the unit conversions 573. However, there is an alternative option for determining a path for conversion of the third data stream before processing by the operator 535. This path defines a different combination of edges, existing in the graph, which may be visited in order to come to node U1. The alternative path starts again with U4, goes through node U5, and then from node U5 to node U1. The alternative path visits only one intermediate node before accomplishing the goal—node U1. The first path and the alternative path are two options that may be used for the unit conversions 573. When determining which one to choose, it may be defined that the shortest path is the preferable one. For example, such logic may be implemented in a query manager, such as the query manager 220, FIG. 2. If such conditions are set forth when determining a path, then the alternative path is the preferred one. Accomplishing conversion with a minimum number of intermediate conversions may optimize the process of unit conversion. The ring mapping 587 may also be used for determining the conversion from U1 to U5, which may be accomplished with one-step conversion, as there is an edge between node U1 and U5 in the graph representation of the ring mapping 587.

Figure 6A:
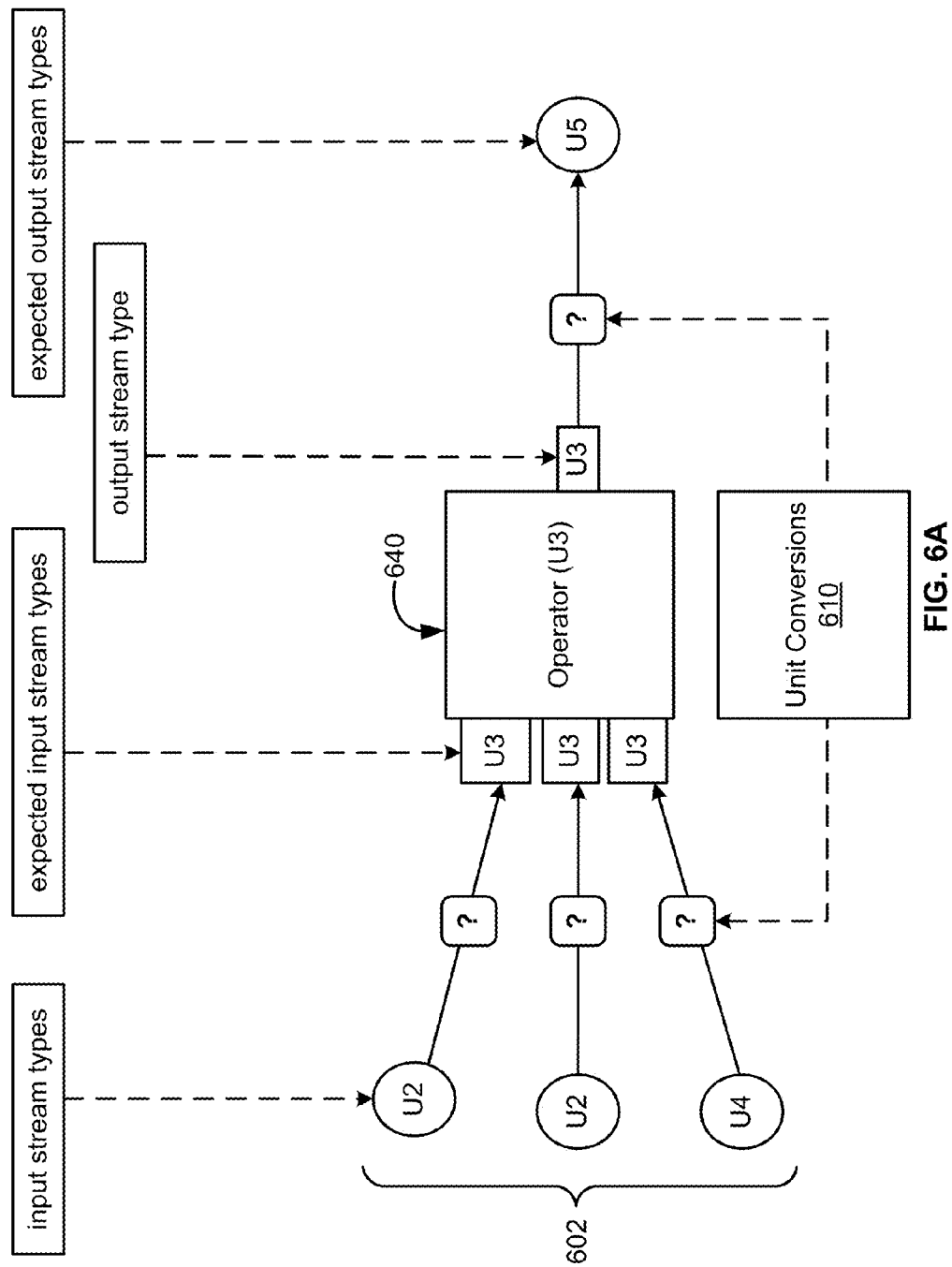
FIG. 6A is a block diagram illustrating an embodiment of an operator for data streams processing.

FIG. 6A is a block diagram illustrating an embodiment of an operator 640 for data stream processing. Input data streams 602 are received and their input stream types are determined. For example, the input stream types define values for a physical quantity "X" (e.g. length, temperature, etc.) units of measure for the data streams 602—U2, U2, and U4. The operator 640 defines expected input stream types, which define expected units of measure. The data streams 602 may define values for physical quantities such as the expected physical quantities by the operator 640, but if there is a difference in units of measure, then conversion may be required. The operator 640 may define for its input requirements that the three data streams that are expected define values for the physical quantity "X" in unit of measure—U3. Therefore, pre-conversion may be required. The expected output stream types may define that the unit of measure is U5. However, the logic implemented in operator 640 for processing the data streams 602 may generate a result output stream having as a unit of measure—U3. Then post-conversion may be required. For performing the pre-conversion and post-conversion, unit conversions 610 may be generated. The unit conversions 610 may be unit conversion operators that use predefined mappings for physical quantity "X" that may assist in accomplishing the conversion operations.

Figure 6B:
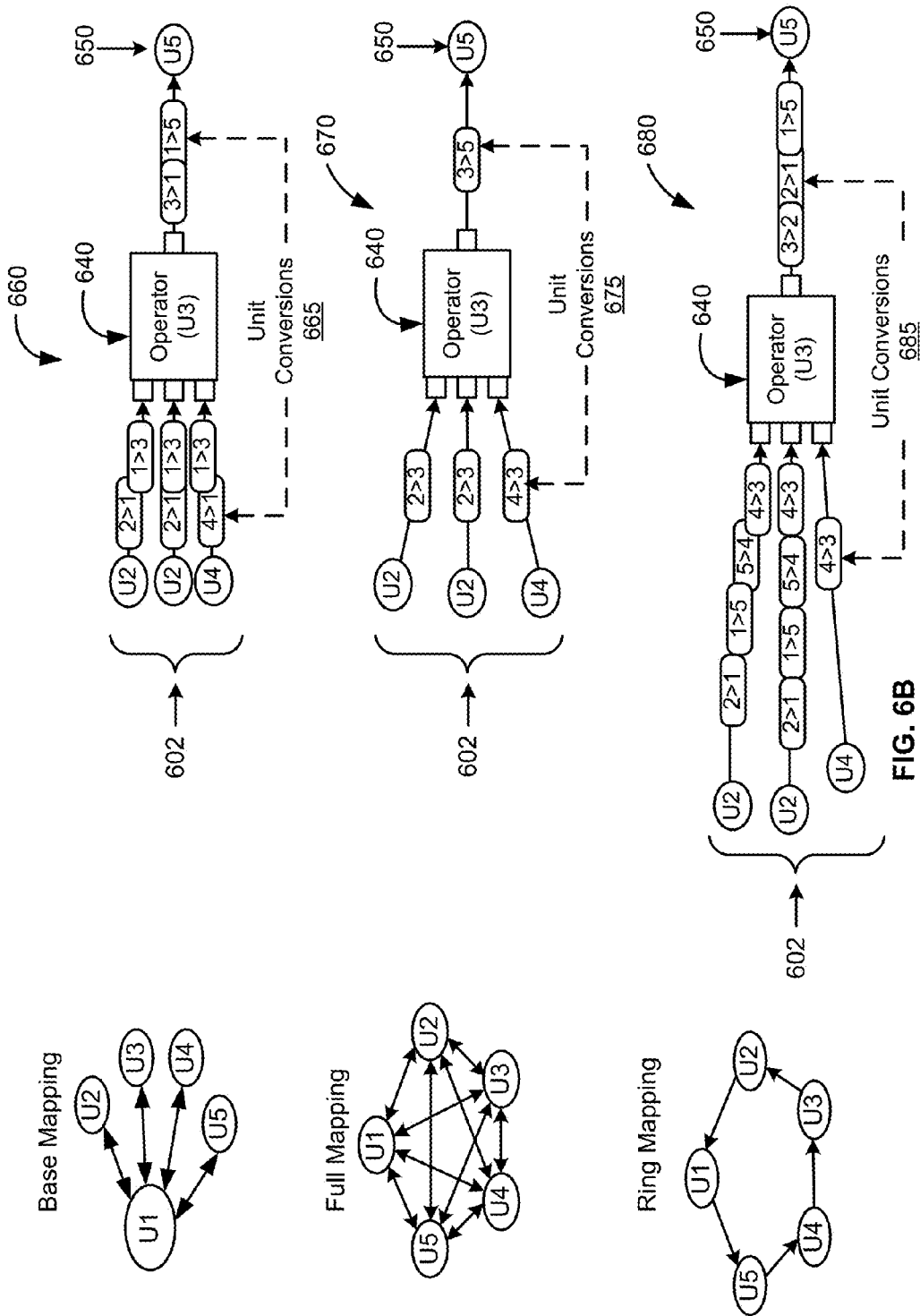
FIG. 6B is a block diagram illustrating embodiments of unit conversions according to different mapping formats, during processing of input data streams.

FIG. 6B is a block diagram illustrating embodiments of unit conversions according to different mapping formats, during processing of input data streams. Unit conversion may be required for data stream processing performed by the operator 640 (in FIG. 4). Such unit conversions may be accomplished by a query manager, such as the query manager 220, FIG. 2. The unit conversion may be performed with the use of predefined data mappings in different mapping formats, for example—base mapping, full mapping, and ring mapping as illustrated in FIG. 6B. If a base mapping for physical quantity "X" is utilized, then a solution for conversion such as solution 660 may be performed. If a full mapping for physical quantity "X" is utilized, then a solution for conversion such as solution 670 may be performed. If a ring mapping for physical quantity "X" is utilized, then a solution for conversion such as solution 680 may be performed. Using the defined mappings in different formats, different options for conversions may be determined. The determination of which path to be taken and implemented in the unit conversion 665, 675, and 685 may be based on an optimization criteria that define the path with the lowest number of converting operations between units of measure until the required conversion is accomplish. The optimization may be performed when only one mapping exists for a single physical quantity. Then, between the different paths that may be defined, the path with the optimal combination of conversions may be selected. If there is more than one mapping format defined for that physical quantity, then the optimization may span through all of the paths that may be determined, utilizing each of the mapping formats. For example, for the conversions required for operator 640, there are three options of mappings—base mapping, full mapping and ring mapping. Therefore, paths for conversion for each of the mapping options may be defined, such as the paths displayed on FIG. 6B. According to the presented solutions 660, 670, and 680, the solution 670 defines conversions with a minimum number of steps for conversion for both the pre-conversion operations and post-conversion operations. Therefore, the solution 670 may be determined to be the optimal path for performing required unit conversions.

Figure 6C:
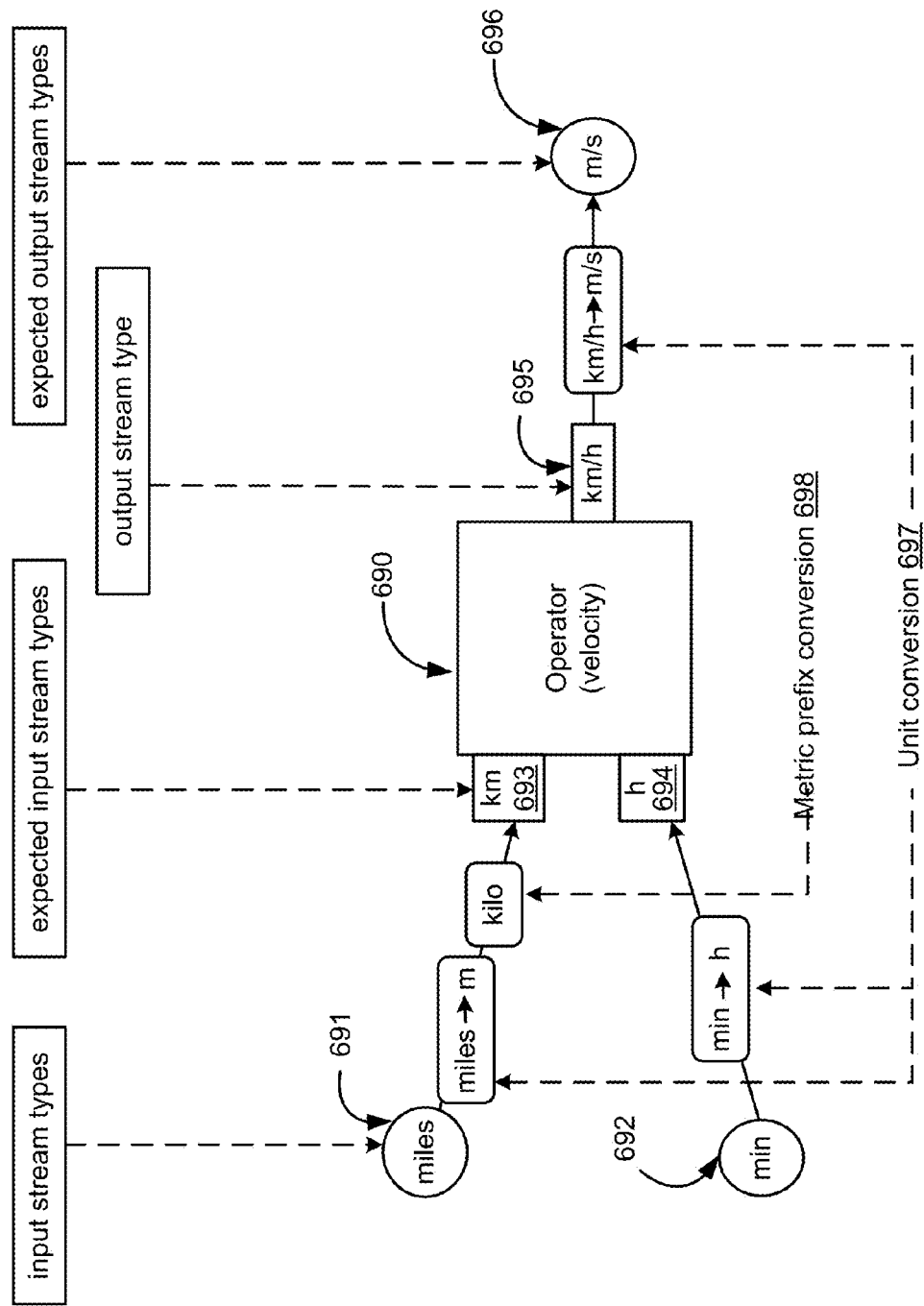
FIG. 6C is a block diagram illustrating an embodiment of a conversion of input streams for processing according to an operator that defines expected input stream types and an output stream type produced for an output stream with an expected stream type.

FIG. 6C is a block diagram illustrating an embodiment of a conversion of input streams for processing according to an operator that defines expected input stream types and expected output stream types. There are two input streams having an input streams types that define physical quantities having units of measure. The first input stream may convey first data 691 about the distance between two destinations, A and B, defined in miles. The second input stream may convey second data 692 about the time that a car need to go from A to B, defined in minutes. An operator 690 performs actions over received data streams and computes velocity by taking input values defined in kilometers 693 (for the distance) and in hours 694 (for the time). The first and the second input stream may be processed by the operator 690 as they define data for the required physical quantities by the operator, but they do not match the expected input units of measure. Therefore, a conversion from miles to kilometers may be required, as well as from minutes to hours. After processing the data streams by the operator 690, unit conversions 697 with conversion operators may be integrated before and after the operator 690 to automatically convert the data streams to generate the expected input and output streams. In one embodiment, the conversion from miles 691 to kilometers 693 may utilize unit mappings, such as the described formats in FIGS. 4A, 4B, and 4C, that may be applied as described in FIG. 5B and FIG. 6B. The described method for conversion may also be utilized with other unit conversions. The unit conversion performed by conversion operators may be seamlessly integrated in the query generation process. Additionally, with the unit conversion, metric prefix conversion may be required. For example, a metric prefix conversion 698 operator "kilo" may be used to perform a metric prefix conversion from $10^{10}$ to $10^3$ such as meters (m) to kilometers (km). The metric prefix conversion 698 operator "kilo" may be used to perform division by one thousand. For example, such "kilo" operator may be used in another case, when the unit of measure "gram" is converted to "kilogram". Other metric prefix conversion operators may also be incorporated in the current solution.

There may be prefixes, such as n, μ, m, c, d, k, M, T, etc., used with values describing physical quantities. When converting the two input data streams before processing them by the operator 690, the metric prefixes may also be converted. In one embodiment, metric prefixes may be included in the unit mappings or according to another embodiment, separate mappings may be built. Including metric prefixes in unit mappings, for example, as part of base mapping, full mapping, etc., may be realized in different approaches. In one aspect, the prefixes may be separately modeled, e.g. as separate mappings. The prefix mapping may be handled similarly to the suggested mapping formats discussed in FIGS. 4A, 4B, and 4C. For instance, with full mapping, such as the full mapping 430, FIG. 4A, only one additional operator is required. With chain mapping, such as the chain mapping 485, FIG. 4C, the mappings between the prefixes may be modeled sequentially, e.g. . . . ⇔ nano ⇔ micro ⇔ milli ⇔ . . . . In another aspect, the prefixes may be included into the unit mapping models. The mapping formats may include all units with metric prefixes. However, this may require a higher effort when creating and maintaining the mappings. Consequently, unit mapping models may become complex. The advantage of the first case is that when a new prefix is added just the prefix mapping has to be updated. In one embodiment, the metric prefix and the physical quantity may be stored in the stream metadata. For instance, the metric prefix and the physical quantity may be stored separately. Alternatively, a mechanism that separates prefixes from the stored couple of a value and a prefix may be utilized. Such mechanism may be required in order to select a proper conversion when processing data streams with data describing physical quantities.

Figure 7:
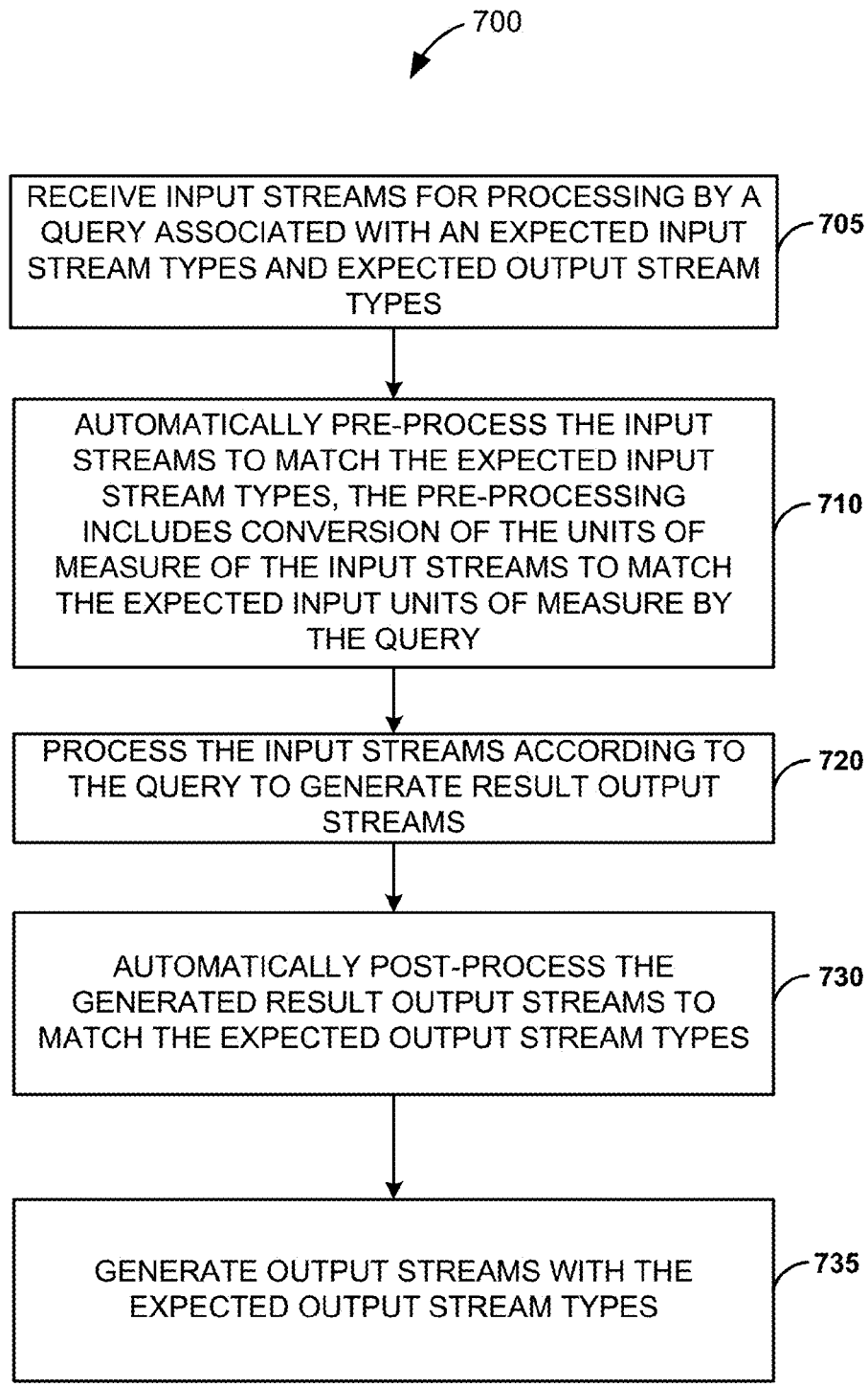
FIG. 7 is a flow diagram illustrating an embodiment of a method for conversion of units of measure during data stream processing.

FIG. 7 is a flow diagram illustrating an embodiment of a method 700 for conversion of units of measure during data stream processing. At step 705, input streams are received for processing by a query. The query may be such as the query 300, FIG. 3. The data stream processing is a continuous process that may include required conversion of the received input streams and the produced output streams to match the defined expected stream types. For example, the query may include one or more operators that perform actions over the received input streams. The input streams may convey data for a physical quantity that is defined in a specific unit of measure. The query may define expected input stream types. Expected output stream type may also be defined by a received interaction, e.g. from a user. At step 710, the input streams are automatically pre-processed to check if they match input requirements of the query, such as the defined expected input stream types. The pre-processing may further include conversion of the units of measure of the input streams, if they do not match the expected input units of measure by the query. At step 720, the converted input streams are processed according to the query and result output streams are generated. At step 730, the generated result output streams are automatically post-process to determine whether they match the expected output stream types. If a conversion is required, at step 735, the result output streams are converted and output streams are generated with the expected output stream types.

Figure 8:
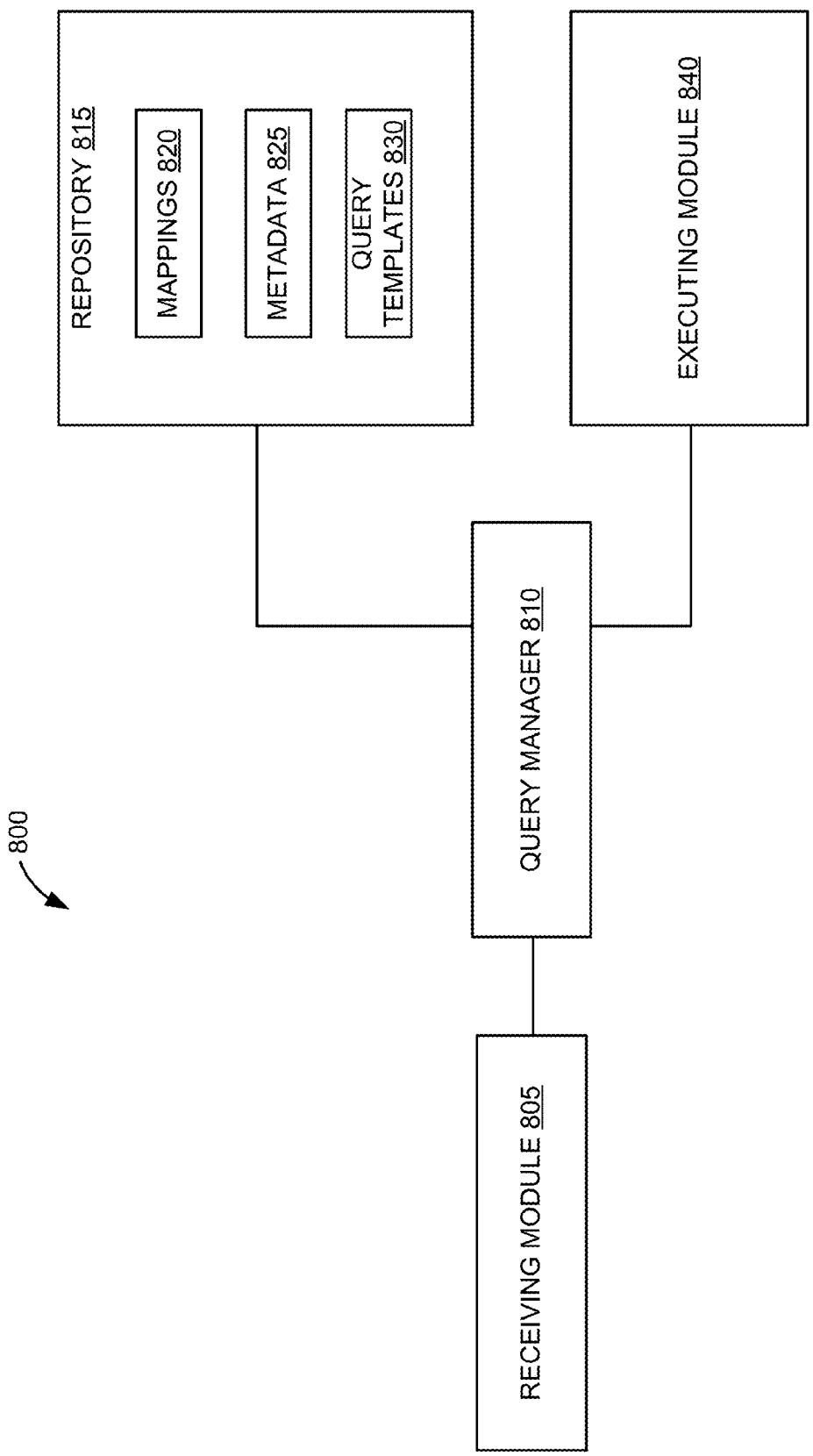
FIG. 8 is a block diagram illustrating an embodiment of a system for conversion of units of measure during data stream processing.

FIG. 8 is a block diagram illustrating an embodiment of a system 800 for conversion of units of measure during data stream processing. A receiving module 805 receives one or more data streams to be processed by a query. The receiving module 805 is in communication with a query manager 810, such as the query manager 220, FIG. 2. The query manager creates a query and substitutes the query's placeholders with the received input streams from the receiving module 805. The query manager 810 is connected to a repository 815 where query templates 830 are stored. A query template is a pre-defined query with some placeholders for the input streams and other parameters. The query manager 810 may use the query templates 830 when creating a query or generate a query without the use of a template. The received input streams have stream metadata that describe the characteristics of the stream, e.g. physical quantities and units of measure. In one embodiment, such stream metadata may be stored separately, for example, in the repository 815 in the metadata 825 module. In such manner, the query manager 810 may take metadata from the metadata 825 module that is relevant for the received data streams and process it when executing operations over the data streams. For example, such metadata may be used when determining if the received data stream matches the input requirements of a query that is about to be created by the query manager 810.

In one embodiment, the query manager 810 analyzes the metadata of the data streams and accomplishes conversions of the units of measure of the data streams when needed. For the conversion of units of measure, the query manager 810 may take predefined mappings from the mappings 820 stored in the repository 815. The mappings 820 may be defined for different physical quantities and in different format, such as the discussed alternatives in FIGS. 4A, 4B, and 4C. The conversions accomplished by the query manager 810 may be such as the suggested solutions for conversion discussed in FIG. 5B, FIG. 6B, FIG. 6C. The query manager 810 may determine a predefined mapping from the mappings 820 that best suits the required conversion. For example, the query manager 810 may choose between two different formats of mappings defined for a given quantity. From the selected mapping format that defines a set of conversions, e.g. the full mapping, the query manager 810 may determine a combination of conversions between a unit of measure of an input stream and the expected unit of measure. The combination may be a path comprising edges from a graph describing the mapping. In one embodiment, the path may be the shortest path that allows transformations between the unit of measure of the received input stream and the expected unit of measure. The query manager 810 may determine a path with minimum number of conversions that may complete the conversion task of the units of measure. In another embodiment, the query manager 810 may determine the shortest path for conversion within different mappings defined for a given physical quantity. The query manager 810 is also connected to an executing module 840. The executing module 840 may execute the created queries by the query manager 810 by consuming the received data streams and producing an output data stream.

Figure 9A:
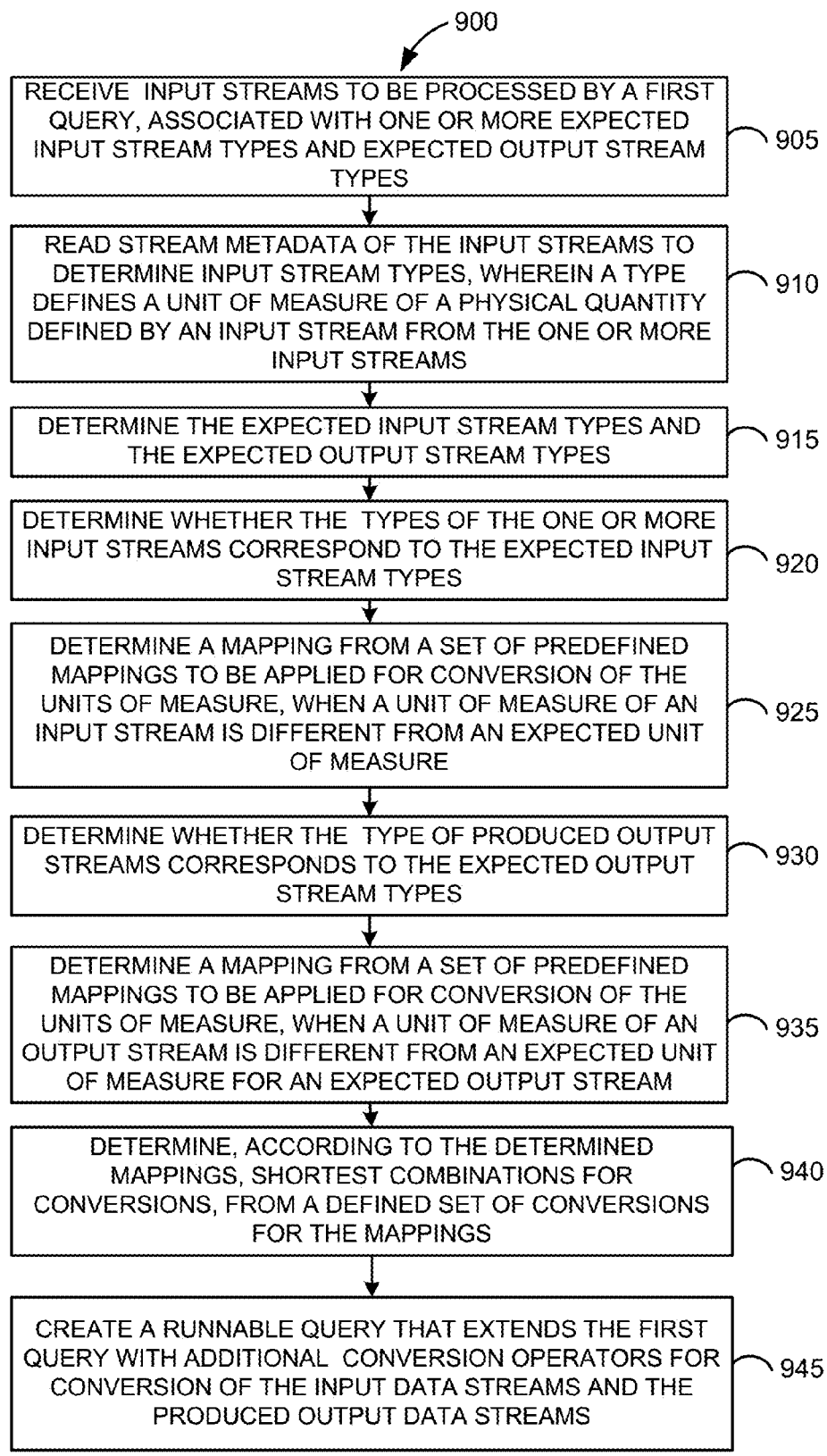
FIG. 9A is a flow diagram illustrating an embodiment of a method for configuration of a first query to create a runnable query that incorporates conversion operators.
Figure 9B:
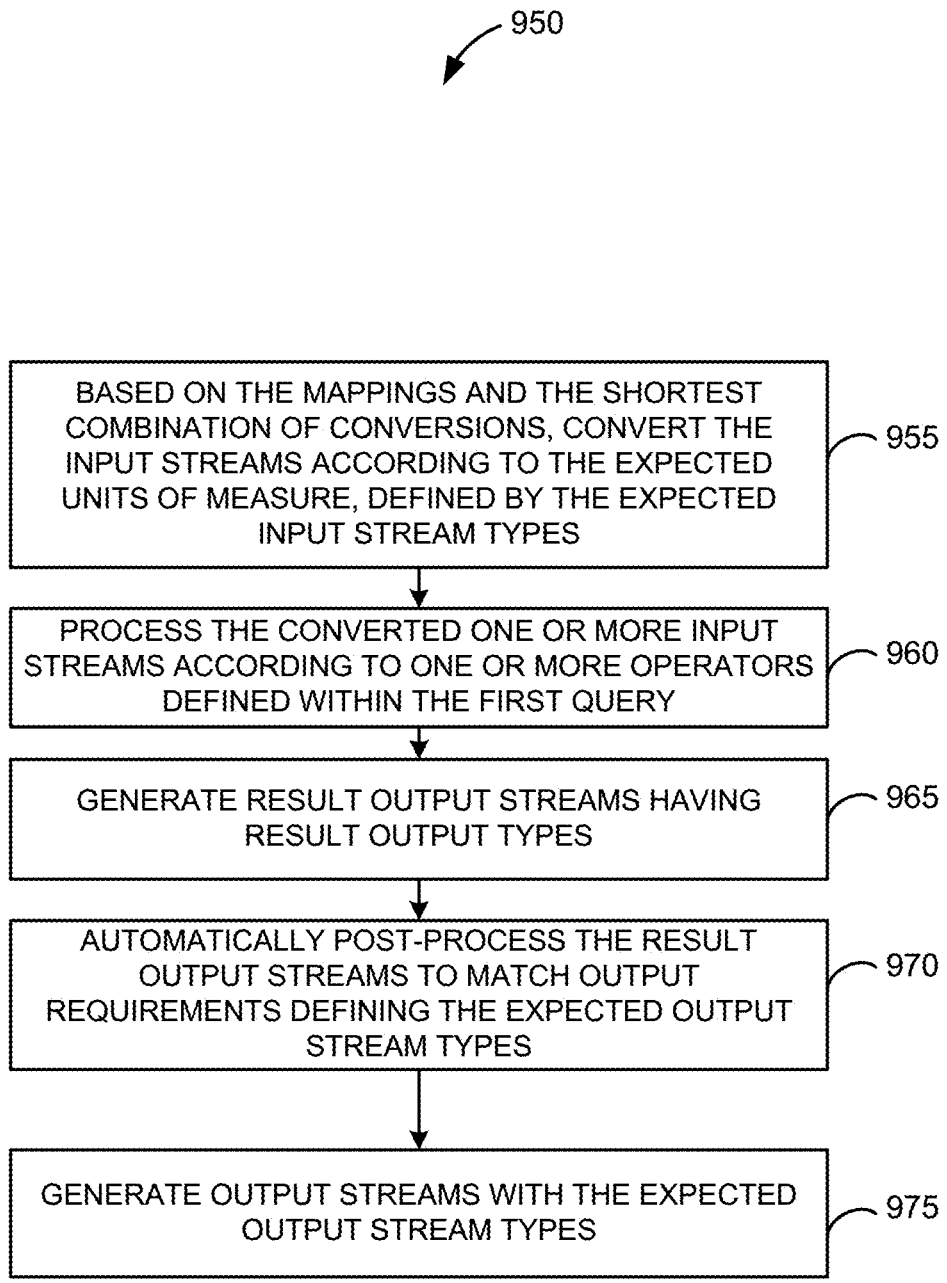
FIG. 9B is a flow diagram illustrating an embodiment of a method for continuous processing of input data streams by executing a runnable query incorporating conversion operators.

FIG. 9A and FIG. 9B are flow diagrams illustrating an embodiment of a method for automatic conversion of units of measure during data stream processing. FIG. 9A describes the process of configuration of a first query to create a runnable query that incorporates conversion operators. In one embodiment the configuration may be accomplished by a query manager, such as the query manager 220, FIG. 2. At step 905, input data streams are received for processing by the query. The query may define input requirements for the received data streams, such as expected input stream types. The expected input stream types may define the type of data that is conveyed through the data streams, e.g. the physical quantity that is described within the data, and also, the unit of measure which is expected for this physical quantity. There may be defined output requirements for the produced output stream. The output requirements may define expected output stream types. The output requirement may be received from a user entered through a GUI. In another example, the output requirements may be stored in a repository as query independent metadata. For example, such query independent metadata may be stored in a repository, such as the repository 815, FIG. 8. At 910, stream metadata of the received input streams is read. For example, the metadata may be transported together with the received input streams. In another embodiment, the metadata may be stored and accessed from a repository, such as the repository 815, FIG. 8. The stream metadata is read to determine input stream types of the received input streams, which includes determining a unit of measure of a physical quantity for each of the received input streams. At step 915, the expected input stream types and the expected output stream types are determined. In one embodiment, metadata for the query that processes the input data streams is read and expected input stream types are determined. The expected output stream types may be extracted from stored metadata, or may be received from a user entry. At step 920, it is determined whether the input stream types of the received input streams correspond to the expected input stream types by the query. If the query expects input streams defining a different physical quantity than the physical quantity defined with the received input streams, then the query may not perform the operations over the received input stream. If there is no correspondence of the types, a unit conversion may be required. At step 925, for performing a unit conversion when the unit of measure of a received data stream is different from the expected unit of measure, a mapping from a list of predefined mappings may be determined and applied. Such mapping may be utilized during the conversion of the received input streams with respect to the units of measure that are used for the data. The determination of a mapping from the list of predefined mappings may be accomplished by a query manager, such as the query manager 810, FIG. 8. The list of predefined mappings for the physical quantity may be persisted in a repository, e.g. repository 815, FIG. 8. The algorithm for determining a mapping may include selecting from different mappings defined for one and the same physical quantity. The different mappings may be defined in different mapping formats—base mapping, full mapping, ring mapping, etc., as the described mapping in FIGS. 4A, 4B, and 4C. At step 930, it is determined whether a type of a produced output stream, from the produced output streams, corresponds to the expected output stream type, which was determined at step 915. At step 935, a mapping from a set of predefined mappings is determined Such mapping is applied for conversion of units of measurement, when a unit of measure of an output stream differs from the expected unit of measure defined by the expected output stream types. In one embodiment, the set of predefined mappings used for the mapping when converting output streams may be the same as the set of predefined mappings discussed at step 925 for conversion of the input data streams. At step 940, shortest combinations for conversions are determined based on the determined mappings for the physical quantity. The shortest combinations for conversion are defined for both the conversions over the received input data streams and the produced output data streams by the first query. A shortest combination means that the number of the conversions is the minimal possible number of conversions that may allow a conversion from one unit of measure to another, utilizing the determined mapping. In one embodiment, the determined mapping may be defined with a graph structure or in a tabular format, as described in FIGS. 4A, 4B, and 4C. The determination of the shortest combination may be such as the described process for determining a combination in FIG. 8. At step 945, a runnable query is created that extends the first query with additional conversion operators for conversion of the input data streams and the produced output data streams.

FIG. 9B is a flow diagram illustrating an embodiment of a method 950 for continuous processing of input data streams by executing a runnable query incorporating conversion operators. The runnable query may be generated by the configuration process described in FIG. 9A. At step 955, based on the determined mappings and the shortest combinations of conversions, the input data streams are continuously converted according to the expected units of measure. At step 960, the converted input streams are continuously processed according to the first query and the comprised operations defined within the first query. At step 965, one or more result output streams are generated that has result output types. In one embodiment, the result output types may correspond to the types of the processed input streams. In another embodiment, the result output types may be reflected by the types of the received input data streams, which may be different from one another. The result output types are not limited to the provided examples. At step 970, the result output streams are post-processed to match the output requirements. For example, an expected output stream type may be defined in the output requirements. The post-processing may include steps for converting the result output streams. If a conversion is required, at step 975, an output stream is continuously generated based on the previously generated result output streams.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 10:
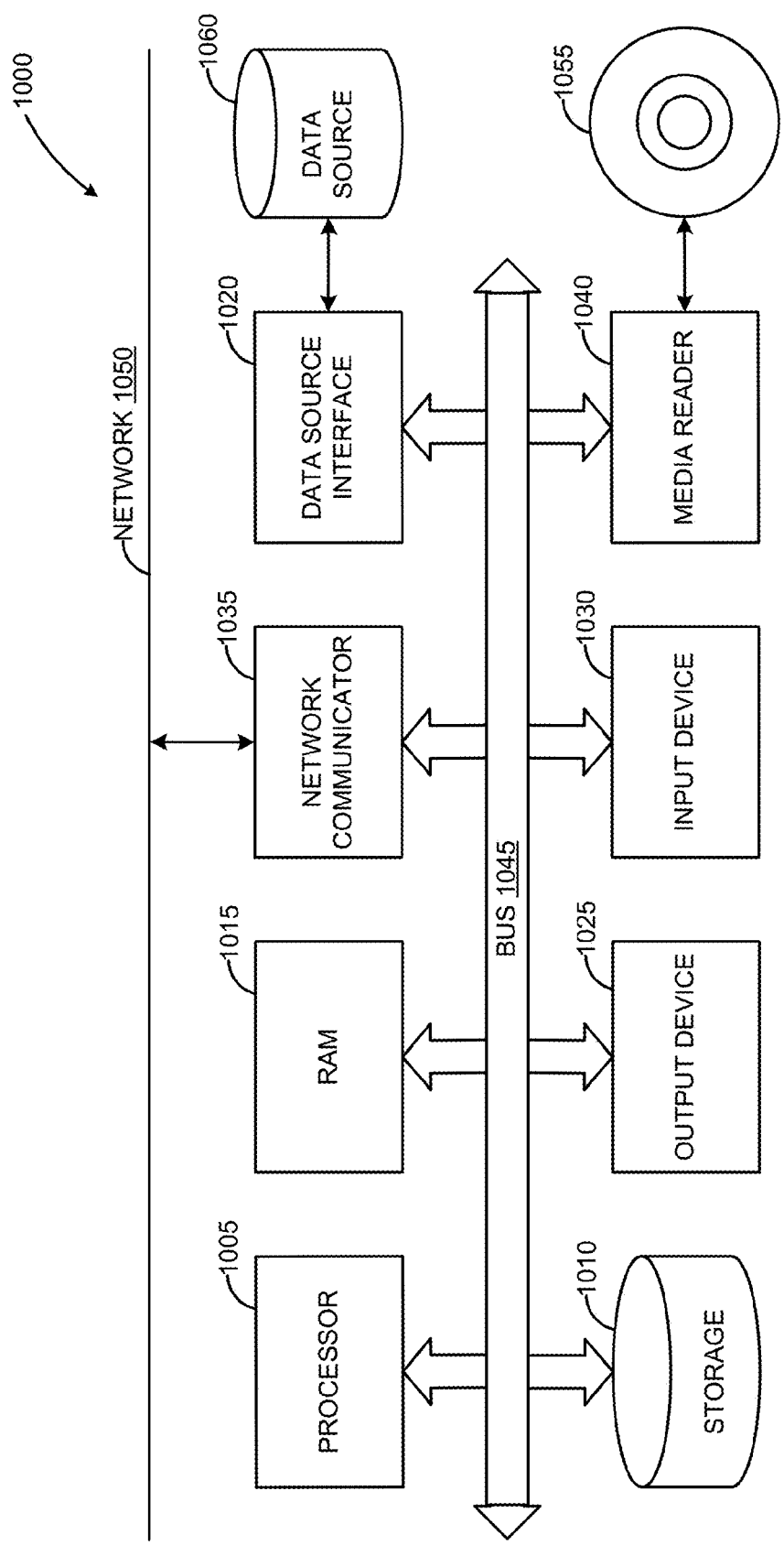
FIG. 10 is a block diagram illustrating an embodiment of a computing environment in which the techniques described for conversion of units of measure during data stream processing can be implemented.

FIG. 10 is a block diagram of an exemplary computer system 1000. The computer system 1000 includes a processor 1005 that executes software instructions or code stored on a computer readable storage medium 1055 to perform the above-illustrated methods. The processor 1005 can include a plurality of cores. The computer system 1000 includes a media reader 1040 to read the instructions from the computer readable storage medium 1055 and store the instructions in storage 1010 or in random access memory (RAM) 1015. The storage 1010 provides a large space for keeping static data where at least some instructions could be stored for later execution. According to some embodiments, such as some in-memory computing system embodiments, the RAM 1015 can have sufficient storage capacity to store much of the data required for processing in the RAM 1015 instead of in the storage 1010. In some embodiments, all of the data required for processing may be stored in the RAM 1015. The stored instructions may be further compiled to generate other representations of the instructions and dynamically stored in the RAM 1015. The processor 1005 reads instructions from the RAM 1015 and performs actions as instructed. According to one embodiment, the computer system 1000 further includes an output device 1025 (e.g., a display) to provide at least some of the results of the execution as output including, but not limited to, visual information to users and an input device 1030 to provide a user or another device with means for entering data and/or otherwise interact with the computer system 1000. Each of these output devices 1025 and input devices 1030 could be joined by one or more additional peripherals to further expand the capabilities of the computer system 1000. A network communicator 1035 may be provided to connect the computer system 1000 to a network 1050 and in turn to other devices connected to the network 1050 including other clients, servers, data stores, and interfaces, for instance. The modules of the computer system 1000 are interconnected via a bus 1045. Computer system 1000 includes a data source interface 1020 to access data source 1060. The data source 1060 can be accessed via one or more abstraction layers implemented in hardware or software. For example, the data source 1060 may be accessed by network 1050. In some embodiments the data source 1060 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the invention are described herein for illustrative purposes, various equivalent modifications are possible within the scope of the invention, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer implemented method for conversion of units of measure during data stream processing, the method comprising:
receiving one or more input streams to be processed by a query, wherein the query defines one or more expected input stream types for the one or more input streams;
pre-processing the one or more input streams to match the one or more expected input stream types, wherein the pre-processing comprises:
determining an input stream from the one or more input streams that is associated with a unit of measure that is different from an expected unit of measure defined for a corresponding expected input stream;
determining a set of predefined mappings for converting the unit of measure, wherein a first mapping defines first formulas for conversion within a set of predefined units of measure associated with the unit of measure, and a second mapping defines second formulas for conversion within the set of predefined units of measure, wherein the first formulas are different from the second formulas;
determining a mapping from the set which includes an optimal path for accomplishing the conversion, the optimal path defining a minimal number of consecutive formulas, defined within the mapping, wherein the minimal number of formulas is determined in comparison with a number of formulas associated with another path for the conversion defined within the set of predefined mappings; and
based on the determined mapping and the optimal path, converting the unit of measure to the expected unit of measure;
processing the pre-processed one or more input streams according to the query to generate a result output stream;
post-processing the result output stream to match an expected output stream type defined by the query; and
generating an output stream with the expected output stream type.

2. The method of claim 1, wherein the query comprises one or more operators.

3. The method of claim 2, wherein the one or more operators are selected from the group consisting of an aggregation operator, a join operator, and a filter operator.

4. The method of claim 1, wherein pre-processing the one or more input streams further comprises:
reading stream metadata of the one or more input streams;
determining one or more types of the one or more input streams, wherein a type from the one or more types defines a unit of measure of a physical quantity defined with an input stream from the one or more input streams;
reading query metadata of the query;
based on the query metadata, determining the one or more expected input stream types and the expected output stream type; and
determining correspondence between the one or more types of the one or more input streams and the one or more expected input stream types.

5. The method of claim 4, wherein the set of mappings includes a base mapping, a full mapping, a partial mapping, a ring mapping, and a chain mapping.

6. The method of claim 4, further comprising:
converting one or more metrics prefixes collocated with the one or more units of measure of the one or more input streams to one or more converted metrics prefixes, corresponding to the one or more expected units of measure of the one or more expected input stream types.

7. The method of claim 1, wherein pre-processing the one or more input streams to match the one or more expected input stream types further comprises:
determining a plurality of combinations for conversions based on the set of predefined mappings, wherein a combination for conversion defines one or more formulas from formulas defined within the mapping, wherein the one or more formulas are consecutive formulas for transforming through intermediate units of measure between a unit of measure of an input stream from the one or more input streams to an expected unit of measure.

8. The method of claim 4, wherein processing the one or more input streams further comprises:
processing the converted one or more input streams according to one or more operators included in the query; and
generating a result output stream having a result output stream type.

9. The method of claim 7, wherein the result output stream comprises a metrics prefix associated with one or more metrics prefixes of the converted one or more units of measure.

10. The method of claim 7, wherein post-processing the result output stream further comprises:
converting the result output stream to generate the output stream with the expected output stream type, when a result output stream type of the result output stream is different from the expected output stream type.

11. The method of claim 9, further comprising:
converting the metrics prefix of the result output stream to an output metrics prefix corresponding to the expected output stream type.

12. The method of claim 11, wherein a converted metrics prefix is collocated with the expected output stream type of the generated output stream.

13. A computer system for conversion of units of measure during data stream processing, comprising:
a processor;
a memory in association with the processor storing instructions related to:
a receiving module to receive one or more input streams to be processed by a query, wherein the query defines one or more expected input stream types for the one or more input streams;
a query manager to generate an executable query based on the query and the received one or more input streams, wherein the query manager comprises instructions to:
pre-process the one or more input streams to match the one or more expected input stream types of the query, wherein the pre-processing comprises instructions to:
determine a set of mappings for conversion of a unit of measure associated with an input stream from the one or more input streams, when the unit of measure of the input stream is different from an expected unit of measure for an expected input stream, wherein a first mapping defines first formulas for conversion within a set of predefined units of measure for a given physical quantity associated with the unit of measure, and a second mapping defined second formulas for conversion within the set of predefined units of measure, and wherein the first formulas are different from the second formulas;

determine a mapping from the set which includes an optimal path for accomplishing the conversion, the optimal path defining a minimal number of consecutive formulas, defined within the mapping, wherein the minimal number of formulas is determined in comparison with a number of formulas associated with another path for the conversion defined within the set of predefined mappings; and convert the unit of measure of the input stream to the expected input unit of measure based on the mapping and the optimal path, and further based on metadata of the input stream and the query;

process the converted one or more input streams according to the query to generate a result output stream; and post-process the result output stream, generated based on the query, to match an expected output stream type, wherein post-processing comprises:
converting the result output stream to generate an output stream with the expected output stream type, when a result output stream type of the result output stream is different from the expected output stream type;

a repository to:
store the set of mappings to be applied for conversion of the units of measure; and an executing module to:
generate the output stream with the expected output stream type by executing the executable query.

14. The system of claim 13, wherein the set of mappings includes a base mapping, a full mapping, a partial mapping, a ring mapping, and a chain mapping.

15. The system of claim 13, wherein the memory further stores instructions related to a metrics conversion module operable to:
convert one or more metrics prefixes collocated with the one or more units of measure of the one or more input streams to one or more converted metrics prefixes, corresponding to the one or more expected units of measure of the one or more expected input stream types.

16. The system of claim 13, wherein the instructions stored by the query manager to pre-process the one or more input streams further comprises instructions to:
determine a plurality of combinations for conversions based on the set of predefined mappings, wherein a combination for conversion defines one or more formulas from formulas defined within the mapping, wherein the one or more formulas are consecutive formulas for transforming through intermediate units of measure between a unit of measure of an input stream from the one or more input streams to an expected unit of measure.

17. An article of manufacture for conversion of units of measure during data stream processing, comprising a non-transitory computer-readable medium storing instructions, which when executed, cause a computer system to:

receive one or more input streams to be processed by a query, wherein the query defines one or more expected input stream types for the one or more input streams, and wherein the query comprises one or more operators;

pre-process the one or more input streams to match the one or more expected input stream types by the query, wherein the pre-processing comprises instructions to:
read stream metadata of the one or more input streams to determine one or more types of the one or more input streams, wherein a type from the one or more types defines a unit of measure of a physical quantity defined with an input stream from the one or more input streams;

read query metadata of the query to determine the one or more expected input stream types;

determine an expected output stream type for an output stream of the query;

determine correspondence between the one or more types of the one or more input streams and the one or more expected input stream types;

determine a set of predefined mappings for conversion of a unit of measure of an input stream from the one or more input streams, when the unit of measure of the input stream is different from an expected unit of measure for an expected input stream, wherein a first mapping defines first formulas for conversion within a set of predefined units of measure associated with the unit of measure, and a second mapping defines second formulas for conversion within the set of predefined units of measure, wherein the first formulas are different from the second formulas;

determine, according to the set of predefined mapping, a plurality of combinations for conversions, wherein a combination for conversion defines one or more formulas from formulas defined within the mapping, wherein the one or more formulas are consecutive formulas for transforming through intermediate units of measure-between a unit of measure of an input stream from the one or more input streams to an expected unit of measure; and determine a mapping from the set of mapping, which includes an optimal path for accomplishing the conversion, the optimal path defining a combination of a minimal number of consecutive formulas, defined within the mapping, wherein the minimal number of formulas is determined in comparison with a number of formulas associated with another path for the conversion defined within the set of predefined mappings; and based on the mapping and the optimal path, convert the unit of measure of the input stream to the expected input unit of measure;

process the converted one or more input streams according to the one or more operators from the query;

generate a result output stream with a result output stream type;

post-process the result output stream to match the expected output stream type, wherein the post-processing comprises instructions to:
convert the result output stream to generate the an output stream with the expected output stream type, when a result output stream type of the result output stream is different from the expected output stream type; and generate the output stream with the expected output stream type.

18. The article of manufacture of claim 17, wherein the set of mappings includes a base mapping, a full mapping, a partial mapping, a ring mapping, and a chain mapping.

19. The article of manufacture of claim 17, further comprising instructions, which when executed by the computer system, cause the computer system to:
- convert one or more metrics prefixes collocated with the one or more units of measure of the one or more input streams to one or more converted metrics prefixes, corresponding to the one or more expected units of measure of the one or more expected input stream types; and
- convert a metrics prefix of the result output stream to an output metrics prefix corresponding to the expected output stream type, wherein the metrics prefix of the result output stream is associated with the one or more converted metrics prefixes of the one or more input streams.

\* \* \* \* \*